United States Patent [19]
Matsubara et al.

[11] Patent Number: 6,076,408
[45] Date of Patent: Jun. 20, 2000

[54] FLUID PRESSURE MEASURING APPARATUS FOR MEASURING PRESSURE BY USING ELEMENT FOR PROVIDING PRESSURE

[75] Inventors: Takeshi Matsubara; Yujiro Kitaide, both of Tokyo, Japan

[73] Assignee: Fuji Electric Co., Ltd., Kawasaki, Japan

[21] Appl. No.: 09/056,095

[22] Filed: Apr. 7, 1998

[30] Foreign Application Priority Data

Apr. 10, 1997 [JP] Japan ................................. 9-091979

[51] Int. Cl.[7] .............................. G01L 7/00; G01L 9/06
[52] U.S. Cl. .................................. 73/714; 73/721; 73/727
[58] Field of Search ........................... 73/720, 721, 726, 73/727, 714; 137/7

[56] References Cited

U.S. PATENT DOCUMENTS

5,259,248  11/1993  Ugai et al. .................................. 73/721
5,481,920   1/1996  Nara .......................................... 73/727

*Primary Examiner*—William Oen
*Attorney, Agent, or Firm*—Kanesaka & Takeuchi

[57] ABSTRACT

A pressure in a pressurizing chamber of a micromachine apparatus for transferring a fluid is measured inexpensively under an actual-use or a similar condition. A piezoelectric element used as an actuator for applying a pressure to the fluid in the pressurizing chamber is also used as a pressure sensor. A charge amplifier is used to measure the amount of charge $Q_1$ applied to an electrode of the piezoelectric element when the piezoelectric element is driven while the pressurizing chamber filled with the fluid, and the amount of charges $Q_2$ when the piezoelectric element is driven while the chamber contains no fluid. The obtained signals are inputted to a storage and operation processing device to determine $(Q_1-Q_2)$ to determine the pressure of the fluid in the pressurizing chamber. The piezoelectric element or capacitor for the purposes of comparison can be used to simultaneously measure $Q_1$ and $Q_2$.

10 Claims, 12 Drawing Sheets

FLUID PRESSURE MEASURING APPARATUS FOR MEASURING PRESSURE BY USING ELEMENT FOR PROVIDING PRESSURE

BACKGROUND OF THE INVENTION AND RELATED ART STATEMENT

The present invention relates to an apparatus for measuring the pressure of a fluid in a pressurizing chamber of a micromachine apparatus that transfers a liquid for industrial or consumer use.

In recent years, the size and weight of sensors and actuators have been significantly reduced, and there is a strong demand for a further reduction in the size and weight. Correspondingly, micromachining based on the etching of silicon wafers has been proposed and put into practical use, and this technique is being extensively researched and applied to ink-jet recording heads and blood sensors.

Figure 10A:
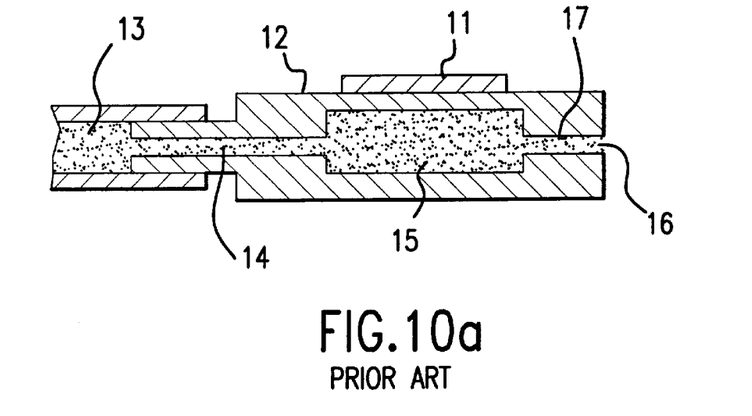
FIG. 10(a) shows the initial condition.
Figure 10B:
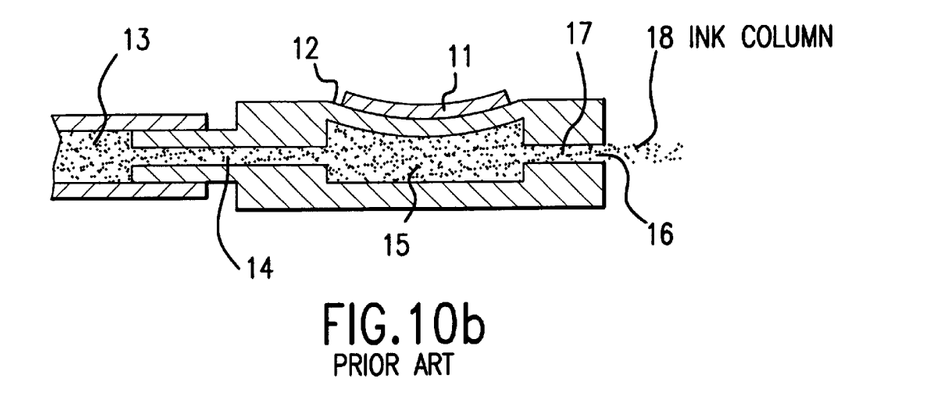
FIG. 10(b) shows a condition in which ink is pressurized.
Figure 10C:
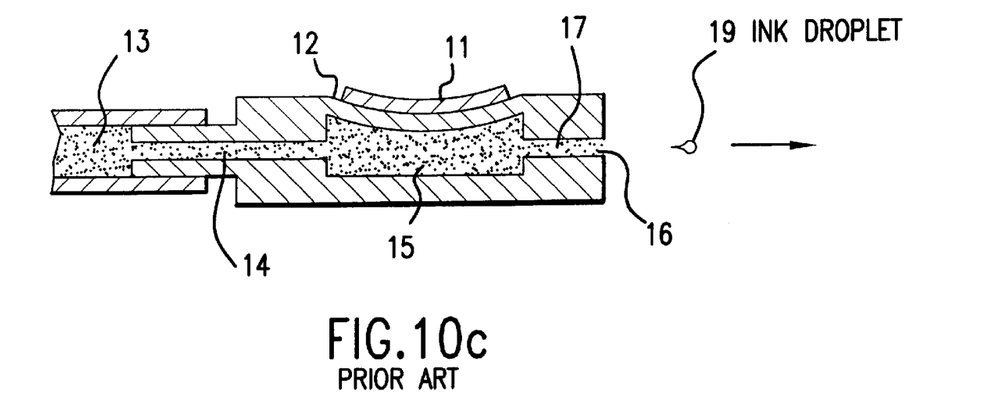
FIG. 10(c) is a cross sectional view showing a condition in which the pressure applied to ink is reduced.

FIGS. 10(a)–10(c) show an operational principle of an ink-jet recording head, which is one example of such applications. FIG. 10(a) is a cross sectional view showing a stable condition prior to ink injection. FIG. 10(b) is a cross sectional view showing a condition in which ink is pressurized. FIG. 10(c) is a cross sectional view showing a condition in which ink droplets are formed.

Ink 17 is filled in an ink refilling section 13, a restraining channel 14, an ink pressurizing chamber 15 and a nozzle 16 that constitute an ink channel, and a piezoelectric element 11 is conductively fixed to a movable portion 12 of the ink pressurizing chamber 15. When a drive circuit (not shown) applies an electric signal to the piezoelectric element 11, the surface of the piezoelectric element 11 is reduced in size by an inverse piezoelectric effect to deform the piezoelectric element 11 together with the movable portion 12, as shown in FIG. 10(b), thereby pressurizing ink in the ink pressurizing chamber 15 to cause an ink column 18 to be ejected from the nozzle 16. The restraining channel 14 controls the flow of ink 17 to the ink refilling section 13 to efficiently flow to the nozzle 16. When the level of the electric signal to the piezoelectric element 11 is reduced to start returning the deformed piezoelectric element 11 to its original form, the tip of the ink column 18 is broken and ejected in the same manner as ink droplets 19, while the remaining part of the ink column 18 flows back into the nozzle 16. This condition is shown in FIG. 10(c). When the electric signal is subsequently lost, the piezoelectric element returns to its original shape and ink 17 returns to the stable condition, so that the initial condition shown in FIG. 10(a) is established.

Figure 11A:
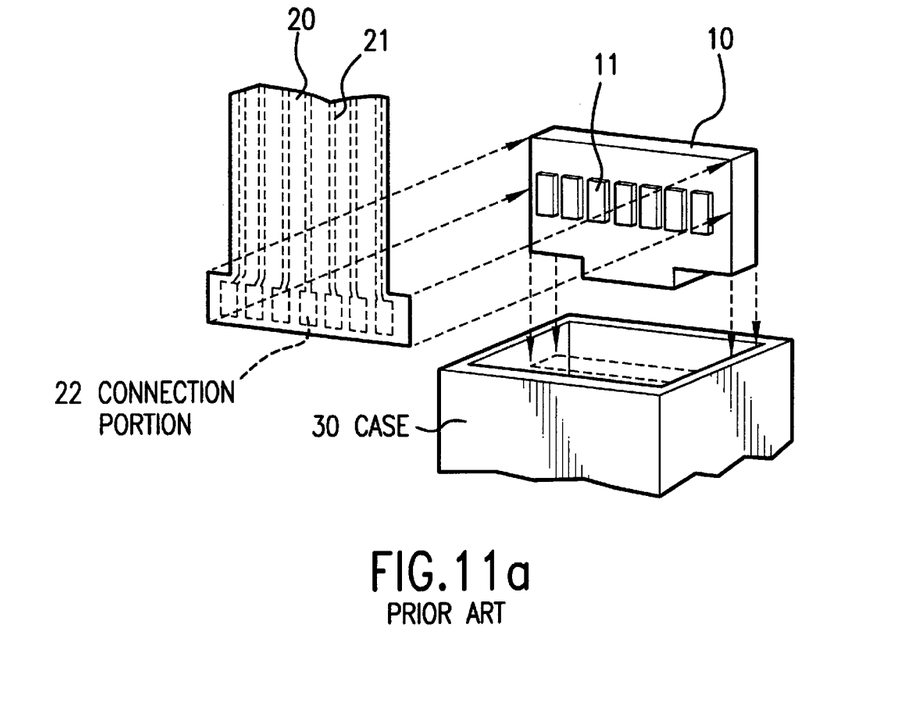
FIG. 11(a) is an exploded perspective view and FIG. 11(b) is a cross sectional view.
Figure 11B:
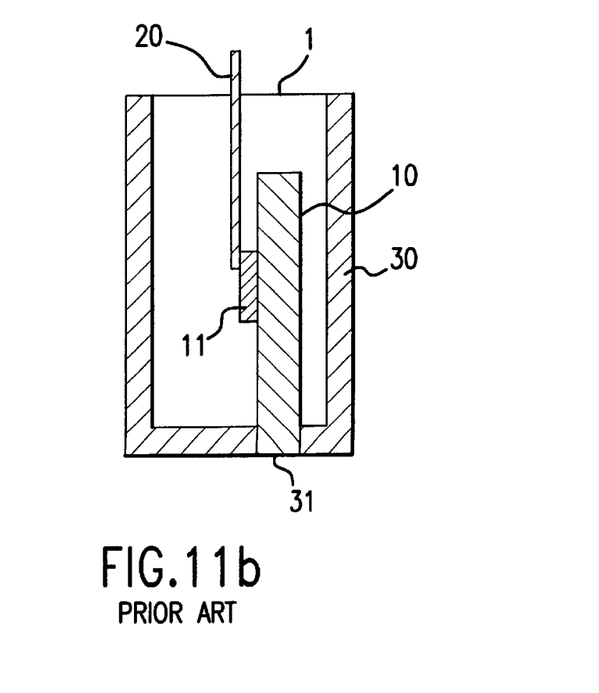

Recent advancement in electronic technology has contributed to the improvement of techniques in which a central processing device is built in an apparatus that includes multiple nozzles for the precise printing of characters, or that uses color inks to record full-color images. FIG. 11 shows an example of such an ink-jet recording head, wherein FIG. 11(a) is an exploded perspective view and FIG. 11(b) is a cross sectional view.

In this example, seven components of the ink channels shown in FIG. 10 are integrated together to form a head body 10. The piezoelectric elements 11 are conductively fixed to portions of the channels corresponding to the ink pressurizing chambers. Each connection portion 22 of a flexible wiring board 20 having a copper foil pattern 21 is connected to each piezoelectric element 11 with solder 22. The head body 10 is positioned in a guide hole 31, and housed and fixed in a case 30. A nozzle section is formed in a portion of the body that is inserted into the guide hole 31 to eject ink downwardly. In this manner, an ink-jet recording head 1 is constituted as a single unit.

Figure 12:
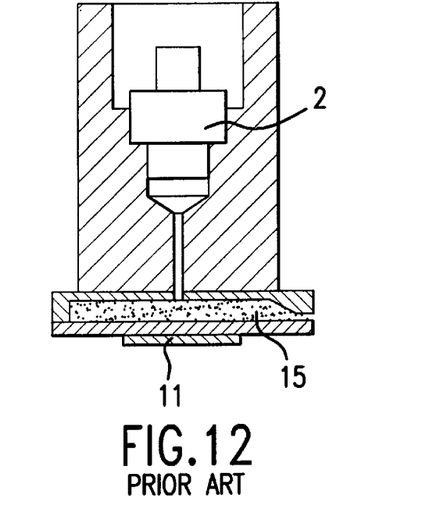
FIG. 12 is a cross sectional view showing one example of a conventional method for measuring the pressure of an ink pressurizing chamber.

In developing a micromachine apparatus such as the ink-jet recording head 1 for transferring a fluid, it is very important to measure the pressure generated inside a pressurizing chamber 15 to evaluate the resistance of the fluid. FIG. 12 is a cross sectional view of the integral part of the apparatus showing an example in which a generally known small pressure sensor 2 is incorporated into a micromachine apparatus for such a purpose. In this figure, the pressure sensor 2 is disposed to communicate with the ink pressurizing chamber 15. As the pressure sensor 2 that is often used for such applications, for example, PYS-3-50H manufactured by Toyoda Machine Works, Ltd. is well known. This sensor, however, is approximately φ3 mm in size and is too large in relation to the size of the ink pressurizing chamber 15 of the micromachine apparatus, for example, 0.5 mm (W)×3 mm (L)×0.1 mm (D), so that changes in the volume of the pressure sensor 2 affect extremely to prevent an accurate pressure value from being obtained.

Figure 13A:
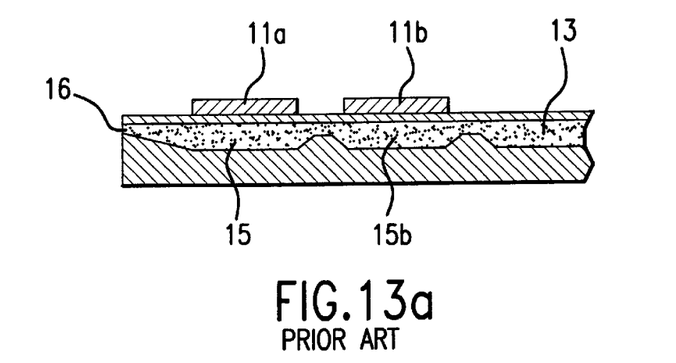
FIG. 13(a) is a cross sectional view and FIG. 13(b) is a plan view.
Figure 13B:
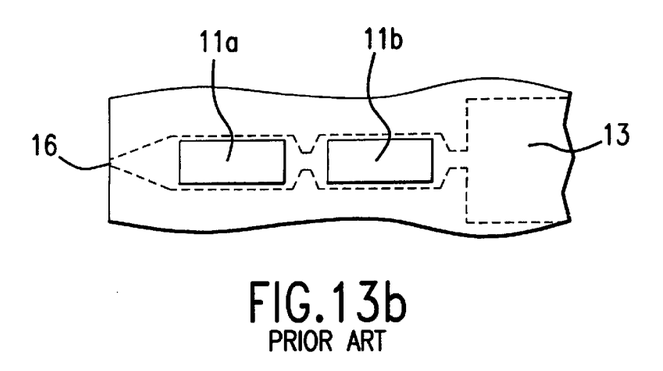

Another known pressure measurement method is described in, "Dynamic Analysis of the Ink Speed in Kyser Ink Jet" (Prof. Kiyohiro of Yamanashi University) in the 1987 Printing Society Journal. This method is shown in FIGS. 13(a) and 13(b). In these figures, a pressure detection chamber 15b is additionally provided in the ink pressurizing chamber 15, and a piezoelectric element 11b for detection is provided on the side wall of the chamber 15b to measure the pressure. This method requires the inclusion of the pressure detection chamber 15b, hampering the miniaturization of the apparatus and requiring a measurement apparatus different from the actual micromachine apparatus to be produced.

It is an object of this invention to provide an apparatus for inexpensively measuring the pressure in the pressurizing chamber of a micromachine apparatus in its actual-use condition or a similar condition, without large changes in volume or the provision of a special detection chamber constructed based on the existing technology.

SUMMARY OF THE INVENTION

The basic concept of this invention is that a piezoelectric element used as an actuator is also used as a pressure-detecting sensor to eliminate the need for a special sensor. If the piezoelectric element is used as an actuator operating integrally with a movable portion of a pressurizing chamber to vary the volume of the chamber, it can be assumed to be an electrostatic capacity in an equivalent circuit. When, however, a fluid in the pressurizing chamber applies a pressure to the movable portion, charges corresponding to the pressure are generated (the charges can be assumed to be an electromotive force). In the invention, the amount of generated charge or the electromotive force can be measured to measure the pressure applied by the fluid in the pressurizing chamber.

The first to tenth aspects of the invention measure the pressure according to the amount of charge, and the eleventh to twentieth aspects of the invention measure the pressure according to the electromotive force. The first to fifth and eleventh to fifteenth aspects relate to methods, and the sixth to tenth and sixteenth to twentieth aspects relate to apparatuses. Methods and corresponding apparatuses are collectively described below.

According to the first and sixth aspects of the invention, in a fluid transfer apparatus, a pressurizing chamber for changing, i.e. increasing or reducing, a pressure is provided in a part of a channel for transferring a fluid, and a piezoelectric element for increasing or reducing the pressure of the pressurizing chamber is provided on a side wall of the pressurizing chamber. The amount of charge injected or flowing into an electrode of the piezoelectric element while the piezoelectric element is being driven is measured to measure the pressure of a fluid in the pressurizing chamber adjacent to the piezoelectric element.

As described above, the piezoelectric element and the side wall of the pressurizing chamber function as an actuator that is operated by a given electric signal, and also function as a sensor that generates charges corresponding to an external force applied to the actuator. This invention detects the amount of charge corresponding the pressure of the fluid in the pressurizing chamber.

When the piezoelectric element is driven, charges flow due to the drive voltage. This amount of charge must be separated from the amount of charge generated by the pressure.

According to the second and seventh aspects of the invention, as means for separating the amount of charge generated by the pressure, the amounts of charges are measured when the fluid is present in the channel and when no fluid is present in the channel to determine the difference between the two amounts of charges.

Since no fluid pressure is generated when there is no fluid in the channel, the amount of charge corresponding to the pressure of the fluid can be detected by measuring the amount of charge when the fluid is present in the channel and the amount of charge when no fluid is present in the channel.

According to the third and eighth aspects of the invention, as means for separating the amount of charge generated by the pressure, a second piezoelectric element that can be considered to have the same characteristics as the piezoelectric element used as age an actuator is connected parallel to the latter piezoelectric element and is driven to measure the difference between the amounts of charges injected or flowing into the electrodes of both piezoelectric elements.

Since no pressure is applied by the fluid to the second piezoelectric element connected in parallel, the amount of charge corresponding to the pressure of the fluid can be detected by determining the difference between the two amounts of charges.

According to the fourth and ninth aspects of the invention, as means for separating the amount of charge generated by the pressure, a capacitor having the same electrostatic capacity as the piezoelectric element used as an actuator is connected parallel to this piezoelectric element and is driven to measure the difference between the amounts of charges injected or flowing into the electrode of the piezoelectric element and into the capacitor.

Since the piezoelectric element can be replaced by a capacitor in an equivalent circuit, in terms of approximation, this means is also effective.

According to the fifth and tenth aspects of invention, the relationship between a known pressure applied to the pressurizing chamber and the amount of charge generated when the pressure is applied to the pressurizing chamber is predetermined and, based on this relationship, the pressure is calculated from the amount of charge.

Using a calibration curve based on this predetermined relationship, the amount of charge can be easily converted into the pressure.

According to the eleventh and sixteenth aspects of the invention, in a fluid transfer apparatus, a pressurizing chamber for increasing or reducing pressure is provided in a part of a channel for transferring a fluid, and a piezoelectric element for increasing or reducing the pressure of the pressurizing chamber is provided on the side wall of the pressurizing chamber. The electromotive force generated by the piezoelectric element while the element is being driven is measured to measure the pressure of the fluid in the pressurizing chamber adjacent to the piezoelectric element.

According to this and subsequent aspects of the invention, the pressure is measured by using as a signal the electromotive force of the piezoelectric element used as a sensor.

Since a drive voltage is applied when the piezoelectric element is driven, this voltage must be separated from the electromotive force generated by the pressure.

According to the twelfth and seventeenth aspects of the invention, as means for separating the drive voltage from the electromotive force generated by the pressure, the piezoelectric element used as an actuator and a capacitor constitute a bridge circuit, and the outputs of the bridge circuit are measured when the fluid is present in the channel and when no fluid is present in the channel to determine the difference between the two outputs of the bridge circuit.

By the bridge circuit, the electromotive force generated by the pressure can be obtained as a bridge output to measure the pressure of the fluid based on the difference in the bridge outputs caused by the presence of the fluid.

According to the thirteenth and eighteenth aspects of the invention, as means for separating the drive voltage from the electromotive force generated by the pressure, a second piezoelectric element that can be considered to have the same characteristics as the piezoelectric element used as an actuator is connected parallel to the latter piezoelectric element. A capacitor is connected to each of the piezoelectric elements to constitute a full bridge circuit. The bridge circuit is driven, and the output of the full bridge circuit is measured.

By the full bridge circuit, the electromotive force generated by the pressure can be directly obtained as a signal.

According to the fourteenth and nineteenth aspects of the invention, as means for separating the drive voltage from the electromotive force generated by the pressure, a capacitor having the same electrostatic capacity as the piezoelectric element used as an actuator is connected parallel to the piezoelectric element, and another capacitor is connected to the first capacitor to constitute a full bridge circuit. The bridge circuit is driven, and the output of the full bridge circuit is measured.

Since the piezoelectric element can be replaced by a capacitor in an equivalent circuit, in terms of approximation, this means is also effective.

According to the fifteenth and twentieth aspects of the invention, the relationship between a known pressure applied to the pressurizing chamber and the electromotive force generated when the pressure is applied to the pressurizing chamber is predetermined and, based on this relationship, the pressure is calculated from the generated electromotive force or the output of the bridge circuit.

By using a calibration curve based on this predetermined relationship, the generated electromotive force or the output of the bridge circuit can be easily converted into the pressure.

BRIEF DESCRIPTION OF THE DRAWINGS

FIGS. 2(a)–2(c) show outputs from a charge amplifier according to the first embodiment, wherein

FIGS. 9(a) and 9(b) show the results of the measurement conducted in accordance with the fourth embodiment, wherein

FIGS. 10(a)–10(c) show the operational principle of an ink-jet recording head, wherein

FIGS. 11(a) and 11(b) show the conventional structure of the ink-jet recording head, wherein

FIGS. 13(a) and 13(b) show another example of a conventional method for measuring the pressure of the ink pressurizing chamber, wherein

DETAILED DESCRIPTION OF PREFERRED EMBODIMENTS

The embodiments of the invention are based on the use of a piezoelectric element as an actuator and also as a sensor for detecting pressure, and can measure the pressure according to the amount of charge or the electromotive force generated when the piezoelectric element is pressurized.

The embodiments are described below.

Figure 1:
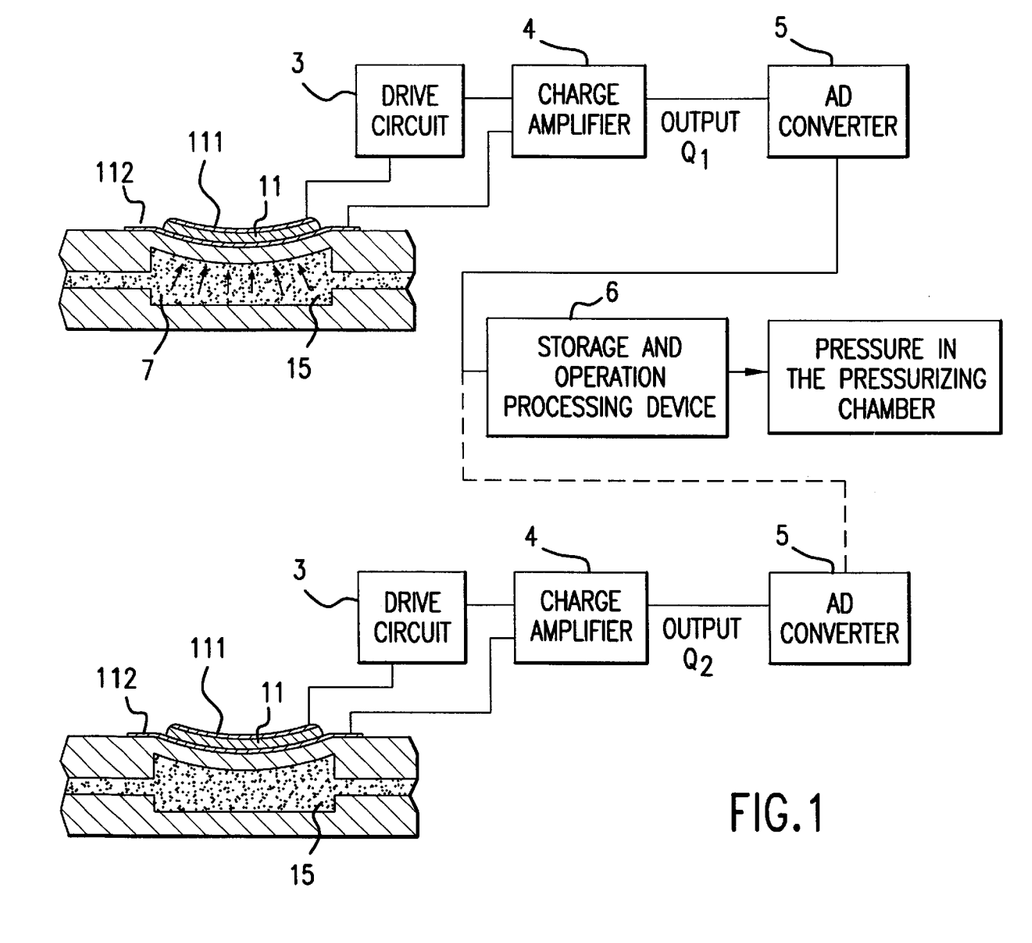
FIG. 1 is a block diagram showing a first embodiment of a pressure measurement method and apparatus according to the invention.

FIG. 1 is a block diagram showing a first embodiment of a fluid pressure measurement method and apparatus according to the invention. With respect to an ink-jet recording head used as a micromachine apparatus for transferring a liquid (hereinafter simply referred to as a "head"), this figure shows only an area around an ink pressurizing chamber 15. The increase and decrease in the pressure of a fluid 7 in the pressurizing chamber 15 are the same as described in the Prior Art using FIGS. 10(a)–10(c), so the description is omitted.

One of output leads from a drive circuit 3 that drives a piezoelectric element 11 is directly connected to one of electrodes (in FIG. 1, an upper electrode 111) of the piezoelectric element, while the other output lead is directly connected to the other electrode of the piezoelectric element 11 (in FIG. 1, a lower electrode 112) via a charge amplifier 4. The output from the charge amplifier 4 is connected to a storage and operation processing device 6, such as a personal computer, through an AD converter 5. In this apparatus, a method for measuring the pressure in the pressurizing chamber 15 when the piezoelectric element 11 is driven by the drive circuit 3 is as follows:

1) When a channel in the head is filled with a liquid (ink), the drive circuit 3 drives the piezoelectric element 11. Once the driving is started, the AD converter 5 continuously AD-converts the output $Q_1$ from the charge amplifier 4 and inputs the results to the storage and operation processing device 6 for storage.

2) In a condition that the liquid has been removed from the channel in the head, the drive circuit 3 drives the piezoelectric element 11. Once the driving is started, the output $Q_2$ from the charge amplifier 4 is continuously stored in the storage and operation processing device 6.

3) Depending on the amount of time that has passed since the start of the driving, the storage and operation processing device 6 determines $(Q_1-Q_2)$.

4) $(Q_1-Q_2)$ is converted into a pressure based on the predetermined relationship (calibration curve) between the amount of charge and the pressure. The order in which 1) and 2) are performed may be reversed.

Figure 2A:
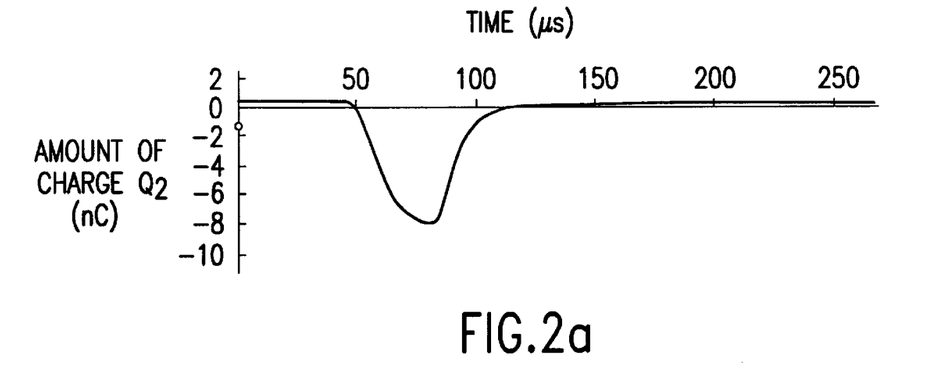
FIG. 2(a) is a chart showing $Q_2$.
Figure 2B:
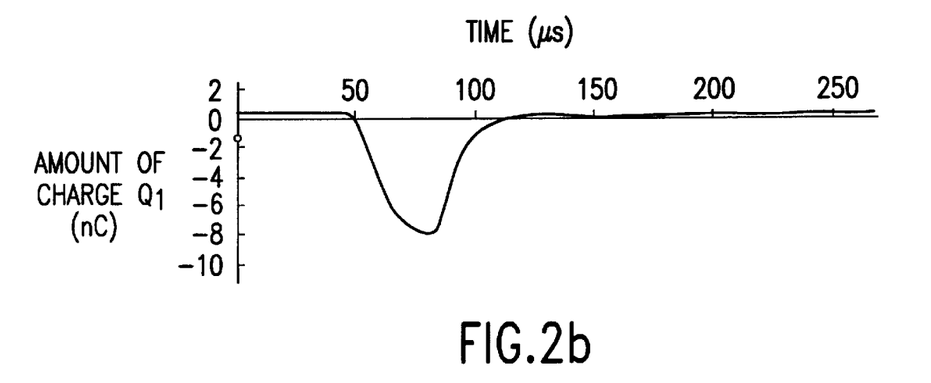
FIG. 2(b) is a chart showing $Q_1$.
Figure 2C:
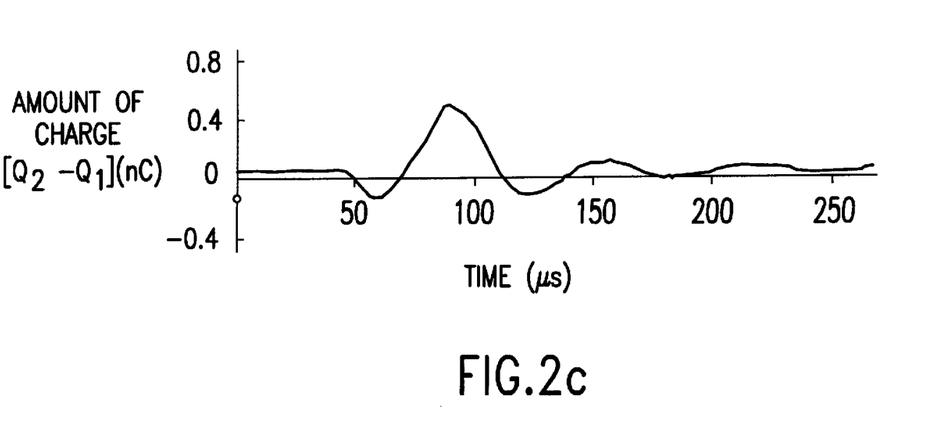
FIG. 2(c) is a chart showing $Q_2-Q_1$.

FIGS. 2(a), 2(b) and 2(c) show $Q_2$, $Q_1$, and $(Q_2-Q_1)$ determined in this manner. The piezoelectric element is 4 mm×0.4 mm×0.03 mm, and the applied pulse is 48 V×35 $\mu$s. In addition, FIGS. 2(a)–2(c) show the measured data obtained when the drive circuit 3 constantly applies a voltage to deform toward the pressurizing chamber 15 the piezoelectric element 11 and the side wall of the pressurizing chamber, which are movable, and when, during pulse application, the voltage becomes zero to recover the element and side wall to their flat conditions, followed by the application of the voltage to continuously deform them toward the pressurizing chamber 15.

FIG. 2(c) shows that the pressure initially becomes negative, followed by the generation of a high positive voltage, followed by attenuation accompanied by vibration. This vibration has a natural frequency determined by the head used.

Next, a method for determining the calibration curve to be used to convert $(Q_1-Q_2)$ into a pressure is described. $(Q_1-Q_2)$ is proportional to the pressure, provided that the pressure falls within a range obtained under a normal use condition, and a conversion factor is thus determined.

Figure 3:
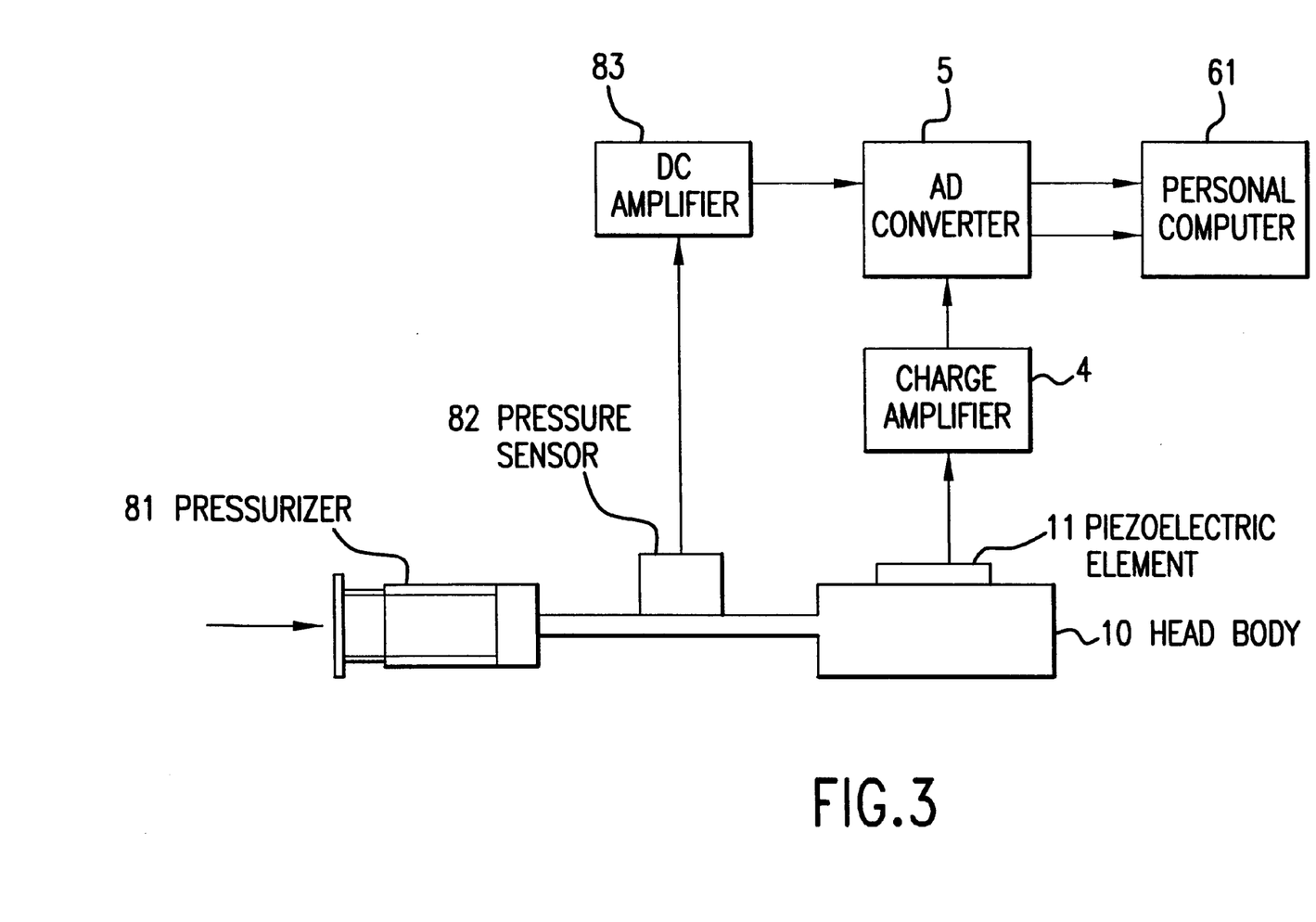
FIG. 3 is a block diagram showing one example of an apparatus for determining a calibration curve on the positive pressure side.
Figure 4:
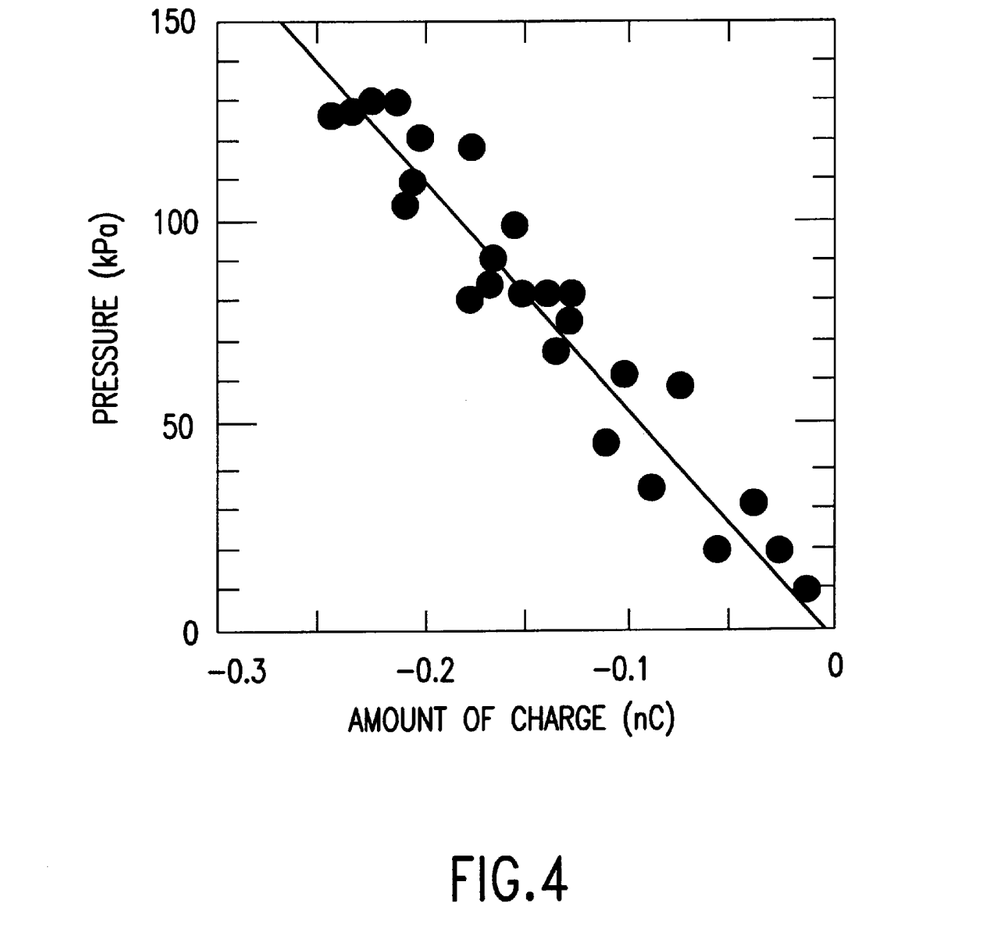
FIG. 4 is a chart showing one example of a calibration curve on the positive pressure side that has been obtained by the apparatus shown in FIG. 3.

FIG. 3 is a block diagram showing one example of a method for determining a calibration curve on the positive pressure side. When a pressurizer 81 applies pressure to a fluid, the pressure is detected by a pressure sensor 82 and the detection signal is amplified by a DC amplifier 83, AD-converted by the AD converter 5, and then inputted into a personal computer 61. On the other hand, the amount of charge generated in the piezoelectric element 11 of a head body 10 that has been subjected to the pressure is detected by the charge amplifier 4, and the detection signal is amplified by the charge amplifier 4, AD-converted by the AD converter 5, and, then inputted into the personal computer 61. A calibration curve is obtained by varying the applied pressure on a step-by-step basis to measure the pressure and charge signals. FIG. 4 is one example of a calibration curve that has been obtained in this manner. The figure shows that the amount of charge is proportional to the pressure within the range of measurement errors.

Figure 5:
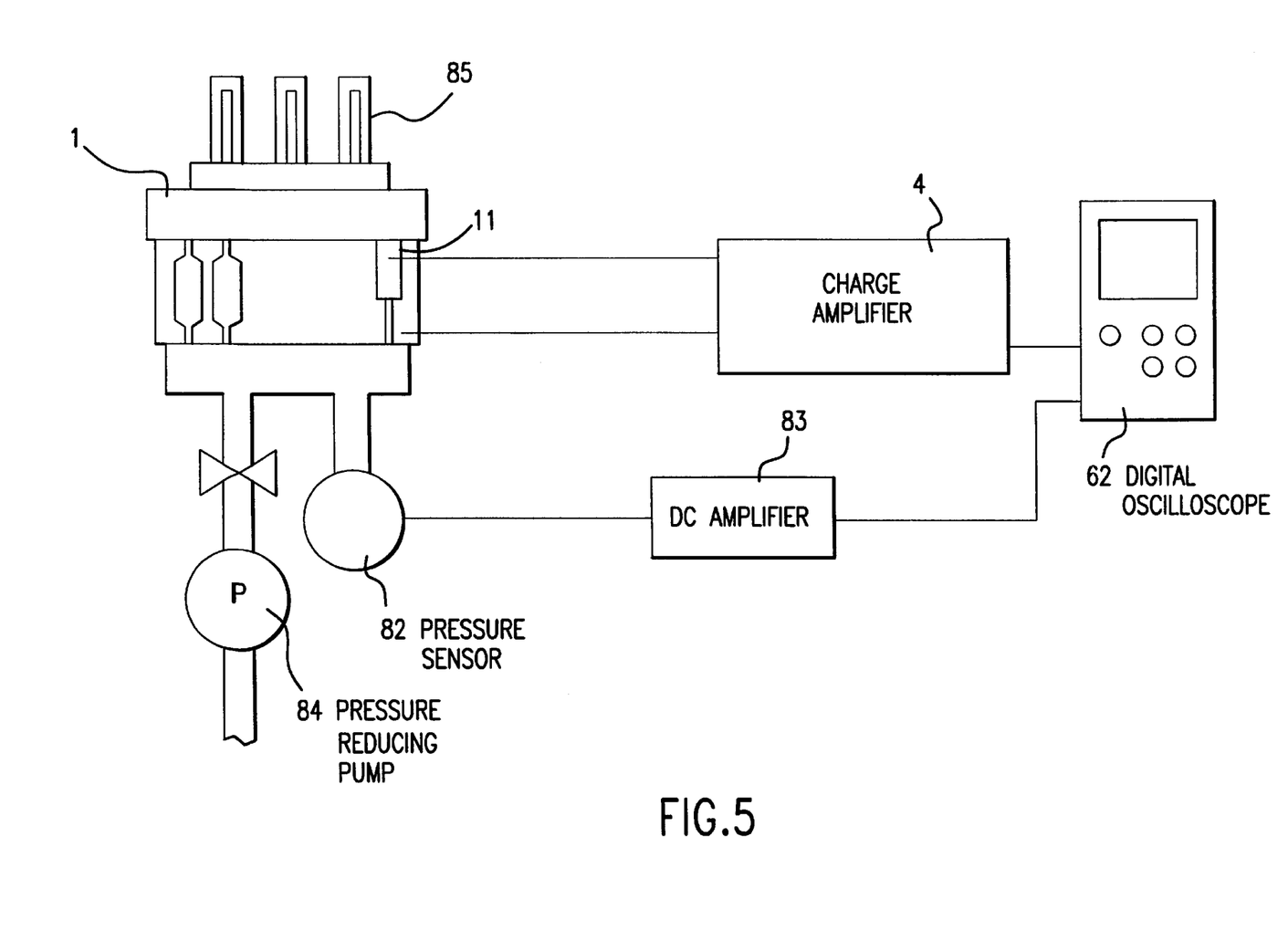
FIG. 5 is a block diagram showing one example of an apparatus for determining a calibration curve on the negative pressure side.
Figure 6:
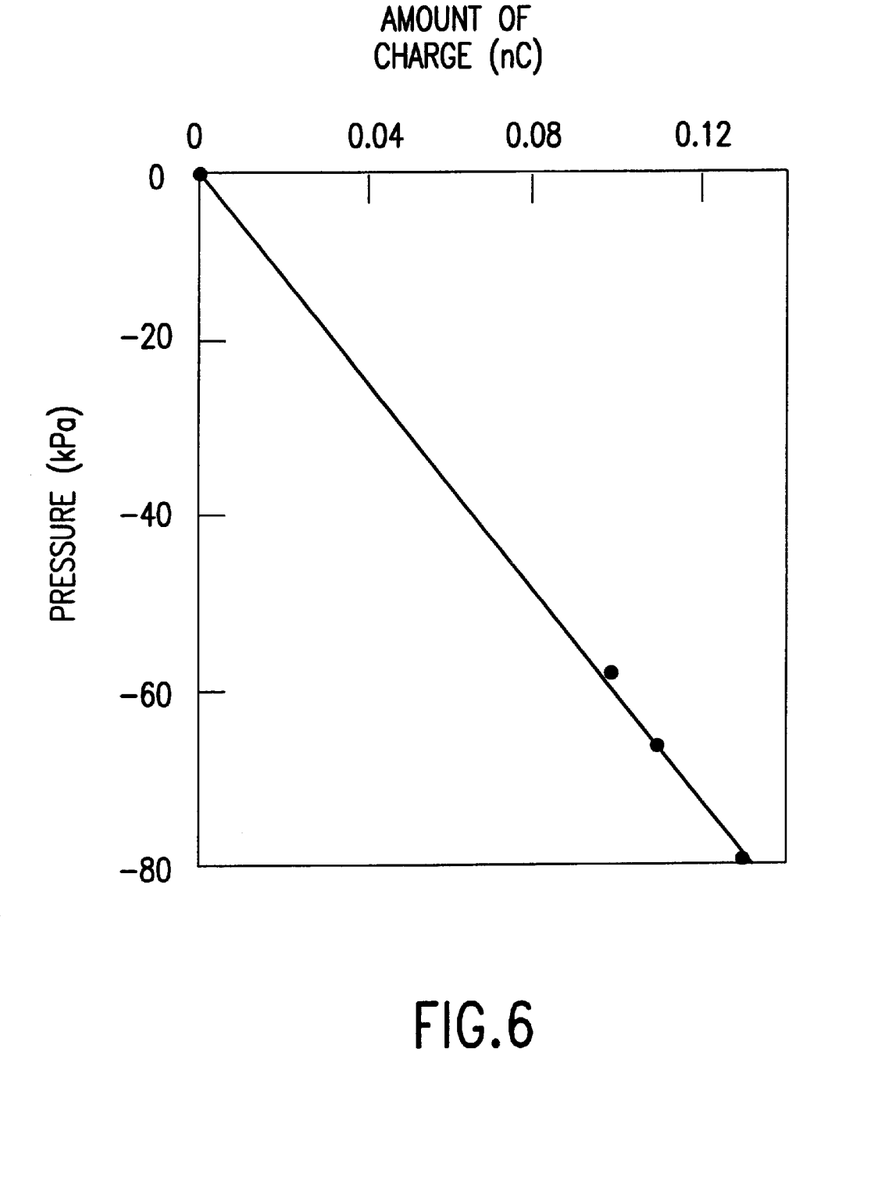
FIG. 6 is a chart showing one example of a calibration curve on the negative pressure side that has been obtained by the apparatus shown in FIG. 5.

FIG. 5 is a block diagram showing one example of a method for determining a calibration curve on the negative pressure side. A pressure-reducing pump 84 such as a vacuum pump or a diaphragm pump reduces the pressure in the channel and, as in the calibration curve on the positive side, a pressure sensor 82 measures the pressure and the charge amplifier 4 detects the amount of charge generated in the piezoelectric element 11 and amplifies the detection signal. Both signals are inputted into a digital oscilloscope 62 to provide a calibration curve. FIG. 6 shows one example of a calibration curve that has been obtained in this manner. This figure also shows that the amount of charge is proportional to the pressure.

A rubber tube 85 on the head 1 is provided to prevent air from flowing in from a nozzle in the head 1 to obtain a sufficient negative pressure.

Figure 7:
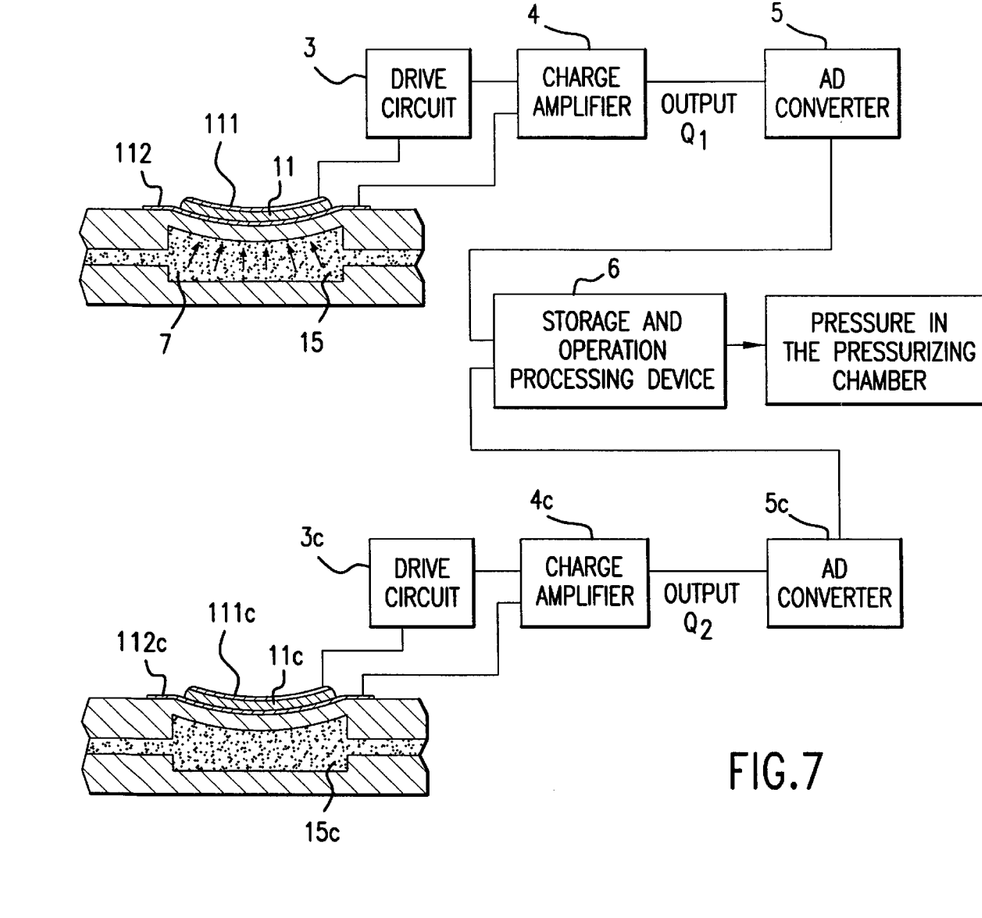
FIG. 7 is a block diagram showing a second embodiment of a pressure measurement method and apparatus according to the invention.

FIG. 7 is a block diagram showing the structure of a second embodiment.

This embodiment comprises a charge-amount measurement section for a head having a fluid 7 therein that is composed of the drive circuit 3 for driving the piezoelectric element 11 on the head used to measure the pressure, the charge amplifier 4 for measuring the amount of charge, and the AD converter 5; and a charge-amount measurement section for a head without a fluid 7 in the channel that is composed of a drive circuit 3c for driving a piezoelectric element 11c on another head (comparison head) having the same configuration and piezoelectric characteristics as the above head, a charge amplifier 4c for measuring the amount of charge, and an AD converter 5c. Thus, this embodiment simultaneously drives the two piezoelectric elements and simultaneously measures and calculates the amounts of charges injected into the respective elements to measure the pressure. In this case, since the piezoelectric elements are not driven in series, the storage and operation processing device 6 need not have a storage function. The comparison head need not constitute the overall channel but must cover only the area of the pressurizing chamber 15c to provide sufficient functions.

This embodiment provides signals similar to those in FIG. 2. It also eliminates the need for the fluid 7 to be injected into or removed from the head for measuring the pressure, or the need to conduct measurements in series, resulting in efficient and quick measurements.

In the third embodiment, instead of the comparison head in the second embodiment, the piezoelectric element on the head for measuring the pressure and the equivalent capacitor are connected to the drive circuit 3c and the charge amplifier 4c, and a procedure similar to that of the second embodiment is carried out to measure the pressure.

This embodiment also provides signals similar to those shown in FIG. 2.

In this case, it is important to use a capacitor having an electrostatic capacity value that is obtained when the piezoelectric element on the head for measuring the pressure is actually used.

Figure 8:
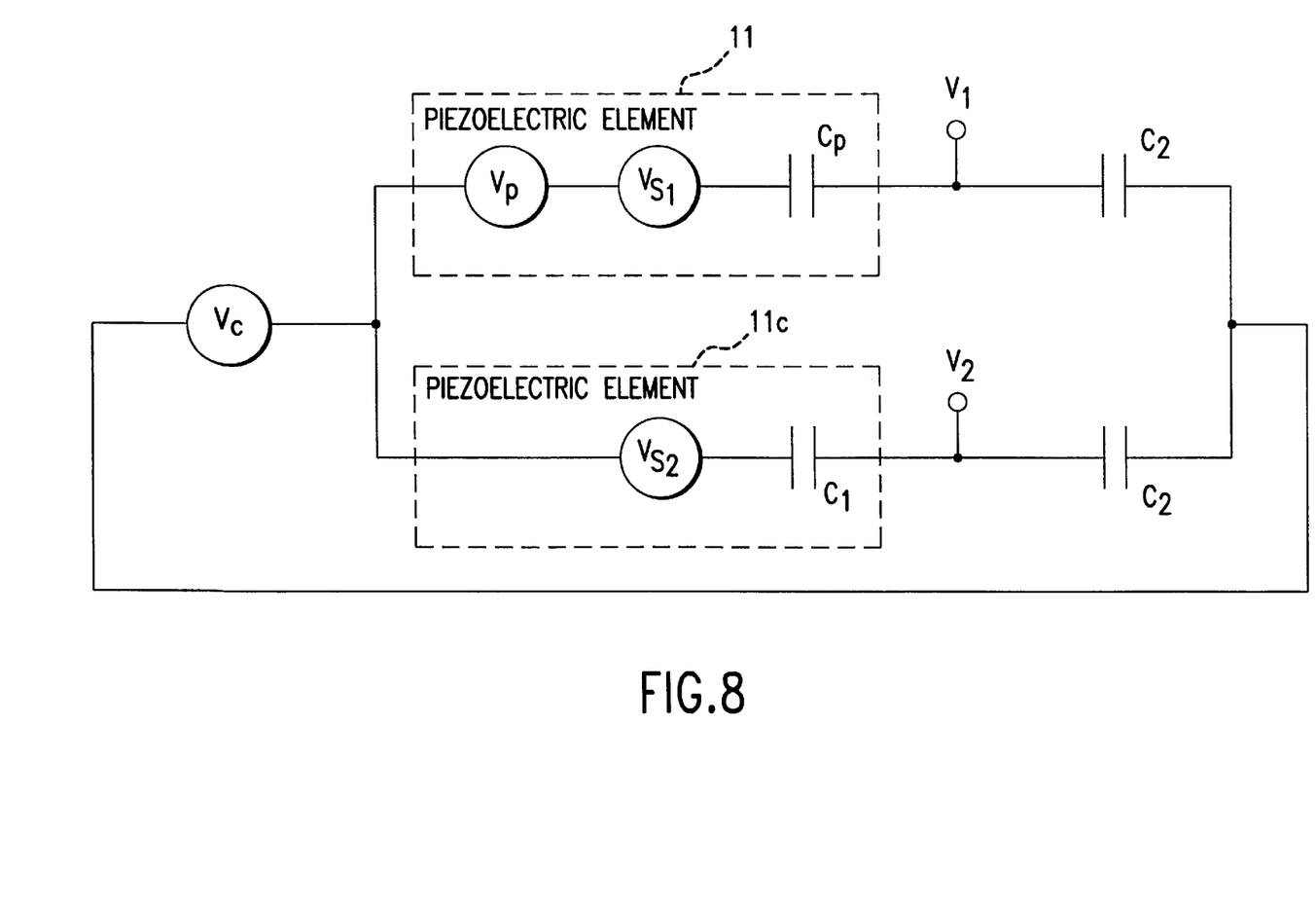
FIG. 8 is an equivalent circuit diagram showing a fourth embodiment of a pressure measurement method and apparatus according to the invention.

In a fourth embodiment, a full bridge circuit is composed by the piezoelectric element 11 used as an actuator, the piezoelectric element 11c for comparison that is conductively fixed to the side wall of the pressurizing chamber as in the element 11 but that is not subjected to the pressure of the fluid, and two capacitors having electrostatic capacity values almost the same as the electrostatic capacity values of the piezoelectric elements 11 and 11c. This embodiment measures as the output of the full bridge circuit the electromotive force generated in the piezoelectric element 11 due to the pressure.

FIG. 8 is a circuit diagram showing the full bridge circuit. The piezoelectric element 11 is substituted by an electrostatic capacity $C_p$ obtained when the element is not restrained, an electromotive force $V_p$ corresponding to the received pressure, and an electromotive force $V_{s1}$ corresponding to distortion occurring when the element used as an actuator is restrained, while the piezoelectric element 11c for comparison is substituted by an electrostatic capacity $C_1$ obtained when the element is not restrained and an electromotive force $V_{s2}$ corresponding to distortion occurring when the element is used as an actuator and restrained.

In this configuration, if $(V_1-V_2)$ is determined, a signal corresponding to the electromotive force $V_p$ in turn corresponding to the received pressure is obtained.

A detailed description follows.

If the voltage applied to the full bridge circuit is defined as $V_c$ and the electrostatic capacity values of the two capacitors are defined as $C_2$, since the distortion of the piezoelectric element 11 is proportional to the voltage applied to $C_p$, the following equation can be established:

$$V_{s1}=a(V_c+V_p); a<0$$

Since the distortion of the piezoelectric element 11c is proportional to the voltage applied to $C_1$, the following equation can be established:

$$V_{s2}=b \times V_c; v<0$$

If it is assumed for simplification that $C_p=C_1=C_2$, $(V_1-V_2)$ can be determined as:

$$\{(a-b)V_c+(1+a)V_p\}/2$$

Then, the following three cases are assumed.

First case: The piezoelectric element 11c for comparison is restrained in the same condition as that of the piezoelectric element 11.

In this case, it can be assumed that a=b, so the following equation can be established:

$$V_1-V_2=(1+a) \times V_p/2$$

If 1>>a, the following equation can be given:

$$V_1-V_2=V_p/2 \quad (1)$$

Second case: The piezoelectric element 11c for comparison is not restrained.

In this case, it can be assumed that b=0, so the following equation can be established:

$$V_1-V_2=\{aV_c+(1+a)V_p\}/2$$

If 1>>a, the following equation can be given:

$$V_1-V_2=\{aV_c+V_p\}/2 \quad (2)$$

$aV_c/2$ has been added to Equation (1). This is because the piezoelectric element 11 used as an actuator is restrained, whereas the piezoelectric element 11c for comparison is not restrained.

Third case: The piezoelectric element 11c for comparison is adhered to a rigid body.

In this case, the absolute value of (b) is larger than that of (a).

$$V_1-V_2=\{(a-b)V_c+(1+a)V_p\}/2$$

If $1 \gg a$, the following equation can be given:

$$V_1-V_2=\{(a-b)V_c+V_p\}/2$$

Figure 9A:
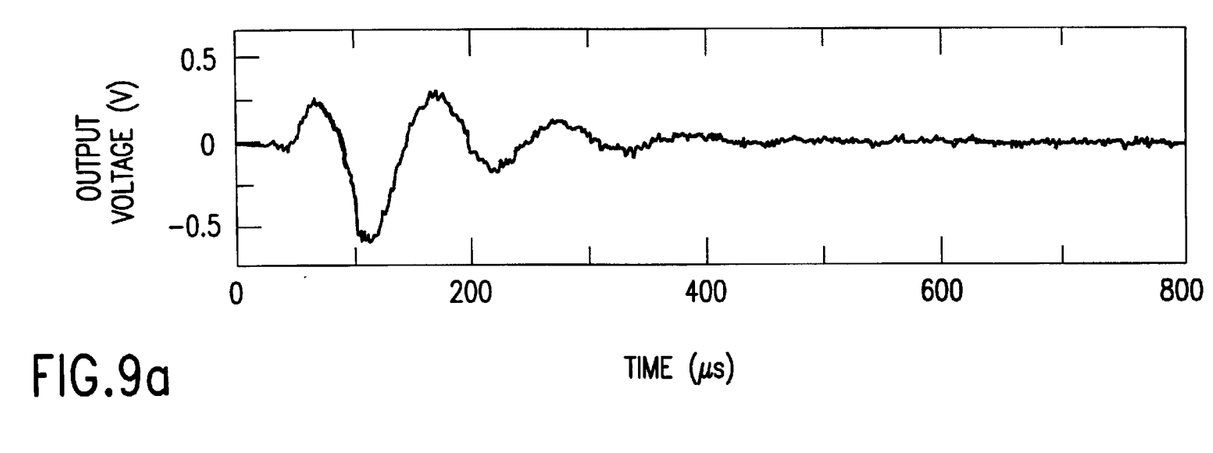
FIG. 9(a) is a chart showing an output obtained when a piezoelectric element having almost the same characteristics is used for the purpose of comparison and FIG. 9(b) is a chart showing an output obtained when a capacitor having the same electrostatic capacity as a free piezoelectric element is used for the purpose of comparison.
Figure 9B:
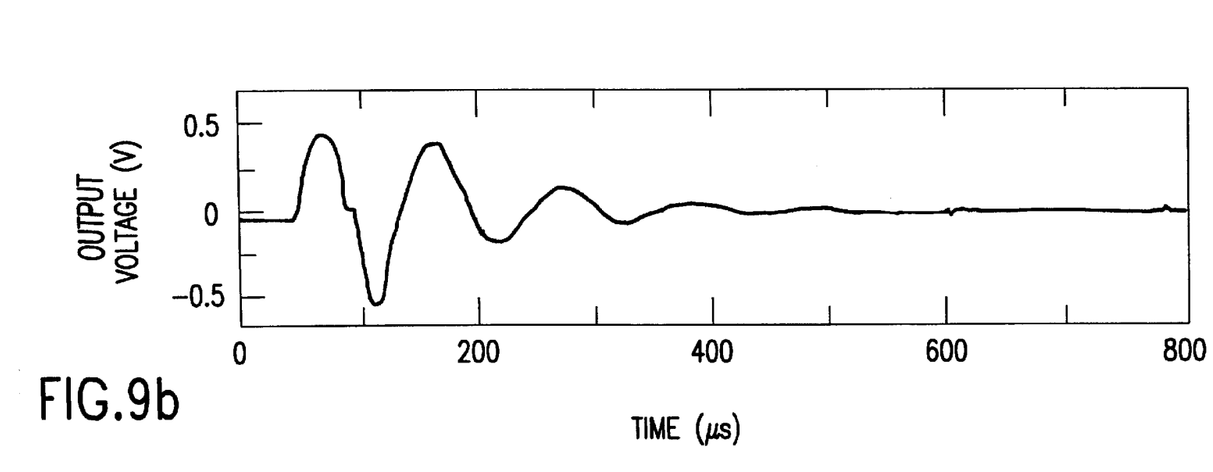

FIGS. 9(a) and 9(b) show $(V_1-V_2)$ actually measured by using the circuit configuration shown in FIG. 8. FIG. 9(a) is a signal curve corresponding to the first case, and FIG. 9(b) is a signal curve corresponding to the second case. In these cases, the drive pulse is 48 V×50 µs. The initial peak of FIG. 9(b) is larger than that of FIG. 9(a). This may be due to the addition of $aV_c/2$. A third case is not shown, but it can be assumed to have a lower initial peak than in FIG. 9(a), or even a negative initial peak.

The pressure can be determined from $(V_1-V_2)$ by determining a calibration curve showing the relationship between $(V_1-V_2)$ and the pressure, as in the first embodiment.

Although this embodiment constitutes a full bridge circuit, the pressure can also be measured by forming a half bridge circuit comprising only the upper half of the full bridge circuit shown in FIG. 8, measuring V1 when the pressurizing chamber is filled with fluid and when it contains no fluid, and determining the difference between the signals obtained in each case.

Furthermore, the piezoelectric element 11c can be substituted by a capacitor having an electrostatic capacity equivalent to that of the piezoelectric element 11.

Thus, a capacitor can be used to constitute a full or half bridge circuit in order to measure the pressure in the pressurizing chamber.

Although the above embodiments have been described in conjunction with the use of the ink-jet recording head as the micromachine apparatus, this invention is equally effective for a general fluid-transfer apparatus having a pressurizing chamber that uses the piezoelectric elements.

According to the first and sixth aspects of the invention, in a fluid transfer apparatus, a pressurizing chamber for increasing or reducing pressure is provided in a part of a channel for transferring a fluid, and a piezoelectric element for increasing or reducing the pressure of the pressurizing chamber is provided on the side wall of the pressurizing chamber. The amount of charge injected or flowing into an electrode of the piezoelectric element while the element is being driven is measured by measuring the pressure of the fluid in the pressurizing chamber adjacent to the piezoelectric element. Thus, the pressure of the fluid can be measured under a condition identical to the actual-use condition with no need to provide a special pressure sensor or pressure detection chamber.

According to the second and seventh aspects of the invention, as means for separating the amount of charge generated by the pressure from the amount of charge from the drive circuit, the amount of charge obtained when the fluid is present in the channel and the amount of charge obtained when no fluid is present in the channel are measured to determine the difference between the two amounts of charges. Thus, the pressure can be accurately measured under the conditions closest to the actual-use condition.

According to the third and eighth aspects of the invention, as means for separating the amounts of charges generated by the pressures, a second piezoelectric element that can be considered to have the same characteristics as the piezoelectric element used as an actuator is connected parallel to the latter piezoelectric element and is driven to measure the difference between the amounts of charges injected or flowing into the electrodes of the two piezoelectric elements. This configuration enables the simultaneous measurement of the amounts of charges in the pressurized piezoelectric element and in the piezoelectric element subjected to no pressure, and eliminates the need for fluid injection or removal operations, thereby simplifying the measurement and substantially reducing the measurement time.

According to the fourth and ninth aspects of the invention, as means for separating the amounts of charges generated by the pressures, a capacitor having the same electrostatic capacity as the piezoelectric element used as an actuator is connected parallel to this piezoelectric element and is driven to measure the difference between the amounts of charges injected or flowing into an electrode of the piezoelectric element and into the capacitor.

This means is also effective in terms of approximation because the piezoelectric element can be substituted by a capacitor in an equivalent circuit. This means also eliminates the need for the piezoelectric element for comparison purposes, enabling the measurements to be conducted inexpensively.

According to the fifth and tenth aspects of the invention, the relationship between a known pressure applied to the pressurizing chamber and the amount of charge generated when the pressure is applied to the pressurizing chamber is predetermined, and based on this relationship, the pressure is calculated from the amount of charge. Thus, the amount of charge can be easily converted into the pressure.

According to the eleventh and sixteenth aspects of the invention, in a fluid transfer apparatus, a pressurizing chamber for increasing or reducing pressure is provided in a part of a channel for transferring a fluid, and a piezoelectric element for increasing or reducing the pressure of the pressurizing chamber is provided on the side wall of the pressurizing chamber. An electromotive force generated in the piezoelectric element while the element is being driven is measured to measure the pressure of the fluid in the pressurizing chamber adjacent to the piezoelectric element. Thus, the pressure of the fluid can be measured under a condition identical to an actual-use condition with no need to provide a special pressure sensor or pressure detection chamber.

According to the twelfth and seventeenth aspects of the invention, as means for separating the drive voltage from the electromotive force generated by the pressure, the piezoelectric element used as an actuator and a capacitor constitute a bridge circuit, and the output of the bridge circuit is measured when the fluid is present in the channel and when no fluid is present in the channel to determine the difference between the two outputs of the bridge circuit. Thus, the pressure can be accurately measured under the condition closest to that in the actual use.

According to the thirteenth and eighteenth aspects of the invention, as means for separating the drive voltage from the electromotive force generated by the pressure, a second piezoelectric element that can be considered to have the same characteristics as the piezoelectric element used as an actuator is connected parallel to the latter piezoelectric element, and a capacitor is connected to each of the piezoelectric elements to constitute a full bridge circuit, which is then driven. Then, the output of the full bridge circuit is measured. Thus, the electromotive force generated by the pressure can be directly obtained as a signal to eliminate the need for fluid injection or removal operations, thereby simplifying the measurement and substantially reducing the measurement time.

According to the fourteenth and nineteenth aspects of the invention, as means for separating the drive voltage from the electromotive force generated by the pressure, a capacitor having the same electrostatic capacity as the piezoelectric element used as an actuator is connected parallel to this piezoelectric element, and a capacitor is connected to the first capacitor and the piezoelectric element to constitute a full bridge circuit, which is then driven. Then, the output of the full bridge circuit is measured.

This means is also effective in terms of approximation because the piezoelectric element can be substituted by a capacitor in an equivalent circuit. This means also eliminates the need for the piezoelectric element for comparison, enabling the measurements to be conducted inexpensively.

According to the fifteenth and twentieth aspects of the invention, the relationship between a known pressure applied to the pressurizing chamber and the electromotive force generated when the pressure is applied to the pressurizing chamtber is predetermined, and based on this relationship, the pressure is calculated f rom the generated electromuotive force or the output of the bridge circuit. Thus, the generated electromotive force or the output of the bridge circuit can be easily converted into the pressure.

What is claimed is:

1. A fluid transfer apparatus, comprising:

a channel for transferring a fluid, a pressurizing chamber provided in a part of the channel for transferring the fluid and having a side wall, a piezoelectric element formed on the side wall of the pressurizing chamber, said piezoelectric element having an electrode and being actuated to deform the side wall for providing a pressure in the pressurizing chamber to eject a part of the fluid outside the channel, measuring means electrically connected to the piezoelectric element, said measuring means measuring an amount of charge flowing into the electrode of the piezoelectric element while the piezoelectric element is being driven to provide the pressure to the pressurizing chamber, said pressure of the fluid in the pressurizing chamber adjacent to the piezoelectric element being measured by said amount of charge measured by said measuring means.

2. A fluid pressure measurement apparatus according to claim 1, wherein said measuring means measures the amount of charge by measuring a first amount of charge flowing into the electrode of the piezoelectric element when the fluid exists in the channel and a second amount of charge flowing into the electrode of the piezoelectric element when no fluid exists in the channel, the pressure of the fluid being determined by a difference between the first and second amounts of charges.

3. A fluid pressure measurement apparatus according to claim 1, further comprising a second piezoelectric element having same characteristics as said piezoelectric element and connected parallel to said piezoelectric element, amounts of charges flowing into electrodes of both piezoelectric elements being measured to determine a difference between the two amounts of charges to thereby measure the pressure of the fluid in the pressurizing chamber adjacent to the piezoelectric element.

4. A fluid pressure measurement apparatus according to claim 1, further comprising a capacitor having a same electrostatic capacity as said piezoelectric element and connected parallel to said piezoelectric element, amounts of charges flowing into the electrode of the piezoelectric element and into the capacitor being measured to determine a difference between the two amounts of charges in order to measure the pressure of the fluid in the pressurizing chamber adjacent to the piezoelectric element.

5. A fluid pressure measurement apparatus according to claim 1, further comprising means to predetermine a relationship between a known pressure applied to the pressurizing chamber and the amount of charge generated when the pressure is applied to the pressurizing chamber, the pressure being calculated based on this relationship.

6. A fluid transfer apparatus, comprising:

a channel for transferring a fluid, a pressurizing chamber provided in a part of the channel for transferring the fluid and having a side wall, a piezoelectric element formed on the side wall of the pressurizing chamber, said piezoelectric element being actuated to deform the side wall for providing a pressure in the pressurizing chamber to eject a part of the fluid outside the channel, and measuring means electrically connected to the piezoelectric element, said measuring means measuring an electromotive force generated in the piezoelectric element while the piezoelectric element is being driven to provide the pressure to the pressurizing chamber, said pressure of the fluid in the pressuring chamber adjacent to the piezoelectric element being measured by the electromotive force.

7. A fluid pressure measurement apparatus according to claim 6, wherein said measuring means for measuring said electromotive force is a bridge circuit formed of said piezoelectric element and a capacitor, the pressure of the fluid being measured from a difference between outputs of the bridge circuit obtained when the fluid exists in the channel and when no fluid exists in the channel.

8. A fluid pressure measurement apparatus according to claim 6, wherein said measuring means for measuring said electromotive force is a full bridge circuit including a second piezoelectric element having same characteristics as said piezoelectric element and connected parallel to said piezoelectric element, with each of the piezoelectric elements being connected to a capacitor, the pressure of the fluid in the pressurizing chamber adjacent to the piezoelectric element being measured by outputs of the full bridge circuit.

9. A fluid pressure measurement apparatus according to claim 6, wherein said measuring means for measuring the electromotive force is a full bridge circuit including a capacitor having a same electrostatic capacity as said piezoelectric element and connected parallel to said piezoelectric element, and another capacitor to constitute the full bridge circuit, the pressure of the fluid in the pressurizing chamber adjacent to the piezoelectric element being measured by the outputs of the full bridge circuit.

10. A fluid pressure measurement apparatus according to claim 6, further comprising determining means to predetermine a relationship between a known pressure applied to the pressurizing chamber and the electromotive force generated when the pressure is applied to the pressurizing chamber, based on this relationship, the pressure being calculated from one of the generated electromotive force and the output of the bridge circuit.

* * * * *

UNITED STATES PATENT AND TRADEMARK OFFICE
CERTIFICATE OF CORRECTION

PATENT NO : 6,076,408

DATED : June 20, 2000

INVENTOR(S): Takeshi Matsubara, Yujiro Kitaide

It is certified that error appears in the above-identified patent and that said Letters Patent are hereby corrected as shown below:

In column 1, line 64, delete "22";

In column 3, line 13, after "corresponding" add --to--;
line 35, delete "age";

In column 8, line 50, change "$V_1-V_2=V_p/2$" to --$V_1-V_2 \fallingdotseq V_p/2$--;
line 54, change "$b=0$" to --$b \fallingdotseq 0$--;
line 56, change "$V_1-V_2=\{aV_c+(1+a)V_p\}/2$" to --$V_1-V_2 \fallingdotseq \{aV_c+(1+a)V_p\}/2$--;
line 60, change "$V_1-V_2=\{aV_c+V_p\}/2$" to --$V_1-V_2 \fallingdotseq \{aV_c+V_p\}/2$--;

In column 11, line 20, change "f rom" to --from--; and
line 21, change "electromuotive" to --electromotive--.

Signed and Sealed this

Third Day of April, 2001

*Attest:*

NICHOLAS P. GODICI

*Attesting Officer*    *Acting Director of the United States Patent and Trademark Office*